(12) United States Patent
Takamine et al.

(10) Patent No.: US 11,997,431 B2
(45) Date of Patent: May 28, 2024

(54) ILLUMINATION DEVICE WITH PROJECTOR AND ILLUMINATION DEVICE

(71) Applicant: SEIKO EPSON CORPORATION, Tokyo (JP)

(72) Inventors: Yusaku Takamine, Azumino (JP); Kosuke Tabayashi, Matsumoto (JP); Yoshitsugu Akutagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 102 days.

(21) Appl. No.: 17/705,707

(22) Filed: Mar. 28, 2022

(65) Prior Publication Data
US 2022/0311977 A1  Sep. 29, 2022

(30) Foreign Application Priority Data
Mar. 29, 2021 (JP) .................. 2021-054664

(51) Int. Cl.
*H04N 9/31* (2006.01)
*F21V 1/10* (2006.01)

(52) U.S. Cl.
CPC .............. *H04N 9/3167* (2013.01); *F21V 1/10* (2013.01)

(58) Field of Classification Search
CPC .. H04N 9/3141; H04N 9/3152; H04N 9/3155; H04N 9/3158; G03B 21/14; G03B 21/20; G03B 21/142; G03B 21/145; G03B 21/208; G03B 21/2046; G03B 21/2053; F21S 6/002; F21S 6/003; F21S 6/004; F21S 6/005
See application file for complete search history.

(56) References Cited

U.S. PATENT DOCUMENTS

| | | | |
|---|---|---|---|
| 9,762,862 B1* | 9/2017 | Worley, III | H04N 9/3176 |
| 10,691,009 B2* | 6/2020 | Wei | H04N 13/349 |
| 10,915,010 B2* | 2/2021 | Lyubarsky | G03B 21/008 |
| 2008/0036897 A1 | 2/2008 | Abe et al. | |
| 2014/0043544 A1 | 2/2014 | Kasuga | |
| 2014/0198949 A1* | 7/2014 | Garlington | G02B 3/0006 382/103 |
| 2015/0198868 A1* | 7/2015 | Sakurai | F16M 11/2014 353/119 |
| 2017/0082911 A1* | 3/2017 | Kasuga | G03B 21/28 |
| 2017/0347007 A1* | 11/2017 | Wu | G03B 21/2053 |

(Continued)

FOREIGN PATENT DOCUMENTS

| CN | 210951168 U | 7/2020 |
|---|---|---|
| JP | 2005-188555 A | 7/2005 |

(Continued)

*Primary Examiner* — Sultan Chowdhury
(74) *Attorney, Agent, or Firm* — Oliff PLC

(57) ABSTRACT

An illumination device with projector includes a projector having a projection optical system, a projector holding section configured to hold the projector, a stand part to be coupled to the projector holding section, and a shade which is configured to cover a periphery of the projector holding section, and is provided with a projection opening through which projection light emitted from the projector is transmitted. The projector holding section is provided with an angle adjustment mechanism for changing a tilt angle of the projector centering on an end portion at an exit side of the projector.

11 Claims, 9 Drawing Sheets

(56) References Cited

U.S. PATENT DOCUMENTS

2019/0341793 A1* 11/2019 Chien .................... F21V 33/00
2021/0072626 A1   3/2021 Tippin
2022/0075251 A1   3/2022 Takamine et al.

FOREIGN PATENT DOCUMENTS

| JP | 2007-174398 A | 7/2007 |
| JP | 2008-042781 A | 2/2008 |
| JP | 2009-156989 A | 7/2009 |
| JP | 2014-035522 A | 2/2014 |
| JP | 2022-046123 A | 3/2022 |

* cited by examiner

ILLUMINATION DEVICE WITH PROJECTOR AND ILLUMINATION DEVICE

The present application is based on, and claims priority from JP Application Serial Number 2021-054664, filed Mar. 29, 2021, the disclosure of which is hereby incorporated by reference herein in its entirety.

BACKGROUND

1. Technical Field

The present disclosure relates to an illumination device with projector, and an illumination device.

2. Related Art

When projecting a projection image with a projector, an appearance of the projector destroys the atmosphere of a space in some cases. In JP-A-2014-035522 (Document 1) and JP-A-2007-174398 (Document 2), there is disclosed an illumination device which houses a projector inside a shade. Since such an illumination device makes it possible to install the projector in a concealed manner, it is possible to prevent the existence of the projector from being felt. Further, such an illumination device can be used as an illumination device when being not used as a projector.

The illumination device in Document 1 is a standing type, and is provided with a base and a support post, an illumination unit installed at an upper end of the support post, and a shade surrounding the illumination unit. The illumination unit is provided with a light, source section and an image formation section, and projects image light toward an inner surface of the shade. The shade displays the image, which is projected by the illumination unit, to the outside. Further, in Document 1, there is disclosed an illumination device with an image light conversion section for changing the direction of the image light of the projector. The image light conversion section is a mirror surface or a prism. For example, the mirror surface is disposed inside the shade, the image light is projected from the illumination unit toward the mirror surface, and the image light reflected by the mirror surface is projected on the inner surface of the shade.

The illumination device in Document 2 is provided with a lampshade installed on the ceiling, and a projector and a plurality of stationary mirrors are disposed inside the lampshade. The image light projected from the projector is reflected by the stationary mirrors, and is then projected on the floor or the ceiling through the lampshade.

The standing-type illumination device is easy to install and is easy to move, and is high in convenience. However, the height and the position of the projection image to be projected indoors differ by an installation space and a purpose. Therefore, there is a demand of making the projection direction variable. The illumination device in Document 2 changes the projection direction using a mirror, but when disposing the mirror inside the shade, there is a problem that the illumination device grows in size.

SUMMARY

In view of the problems described above, an illumination device with projector according to the present disclosure includes a projector having a projection optical system, a projector holding section configured to hold the projector, a stand part to be coupled to the projector holding section, and & shade which is configured to cover a periphery of the projector holding section, and is provided with a projection opening through which projection light emitted from the projector is transmitted, wherein the projector holding section is provided with an angle adjustment mechanism configured to change a tilt angle of the projector centering on an end portion at an exit side of the projector.

Further, an illumination device according to the present disclosure includes a projector holding section, a stand part to be coupled to the projector holding section, and a shade configured to cover a periphery of the projector holding section, wherein the shade is provided with a projection opening through which projection light emitted from a projector to be held by the projector holding section is transmitted, and the projector holding section is provided with an angle adjustment mechanism configured to change a tilt angle of the projector centering on an end portion at an exit side of the projector.

DESCRIPTION OF AN EXEMPLARY EMBODIMENT

An embodiment of an illumination device with projector to which the present, disclosure is applied, and an illumination device without projector will hereinafter be described with reference to the drawings.

Figure 1:
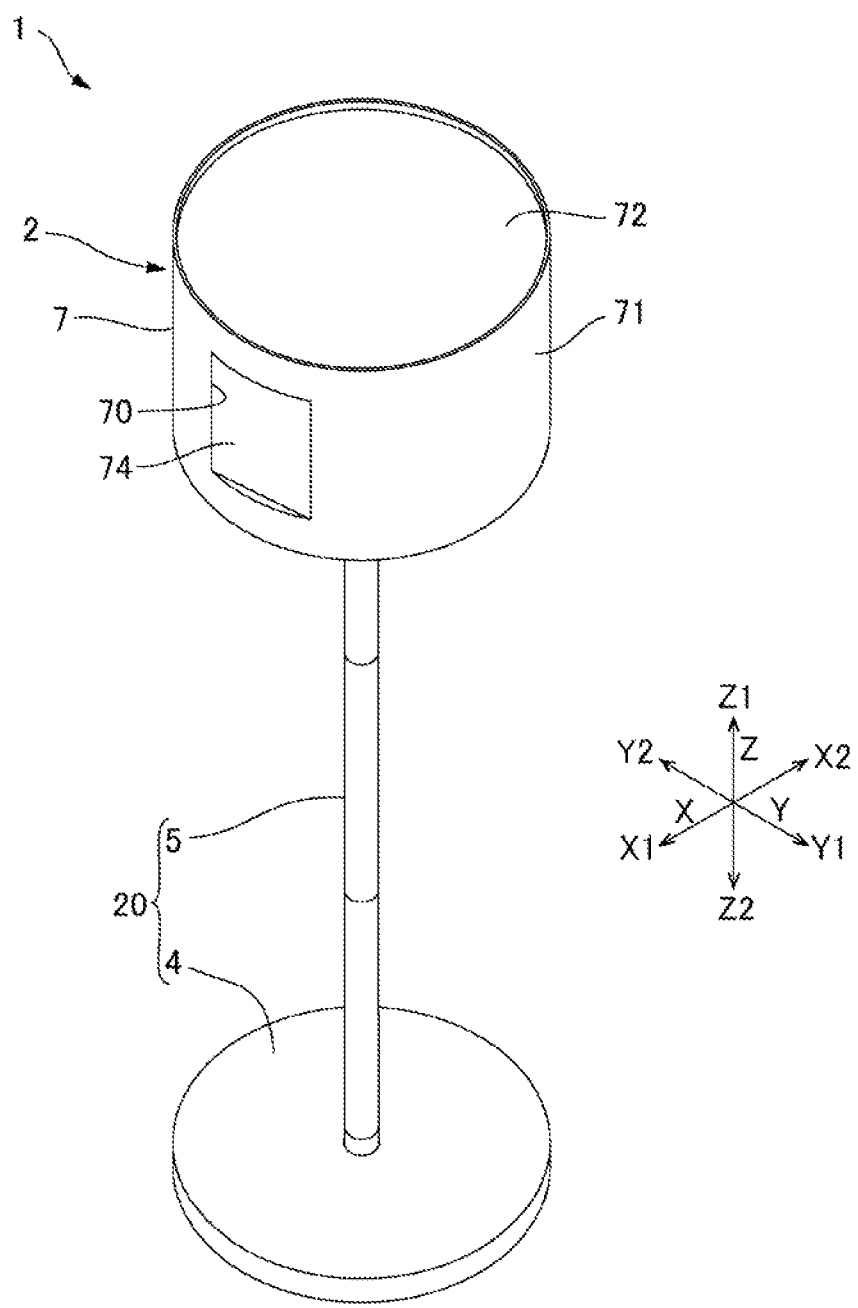
FIG. 1 is an external perspective view of an illumination device with projector to which the present disclosure is applied.
Figure 2:
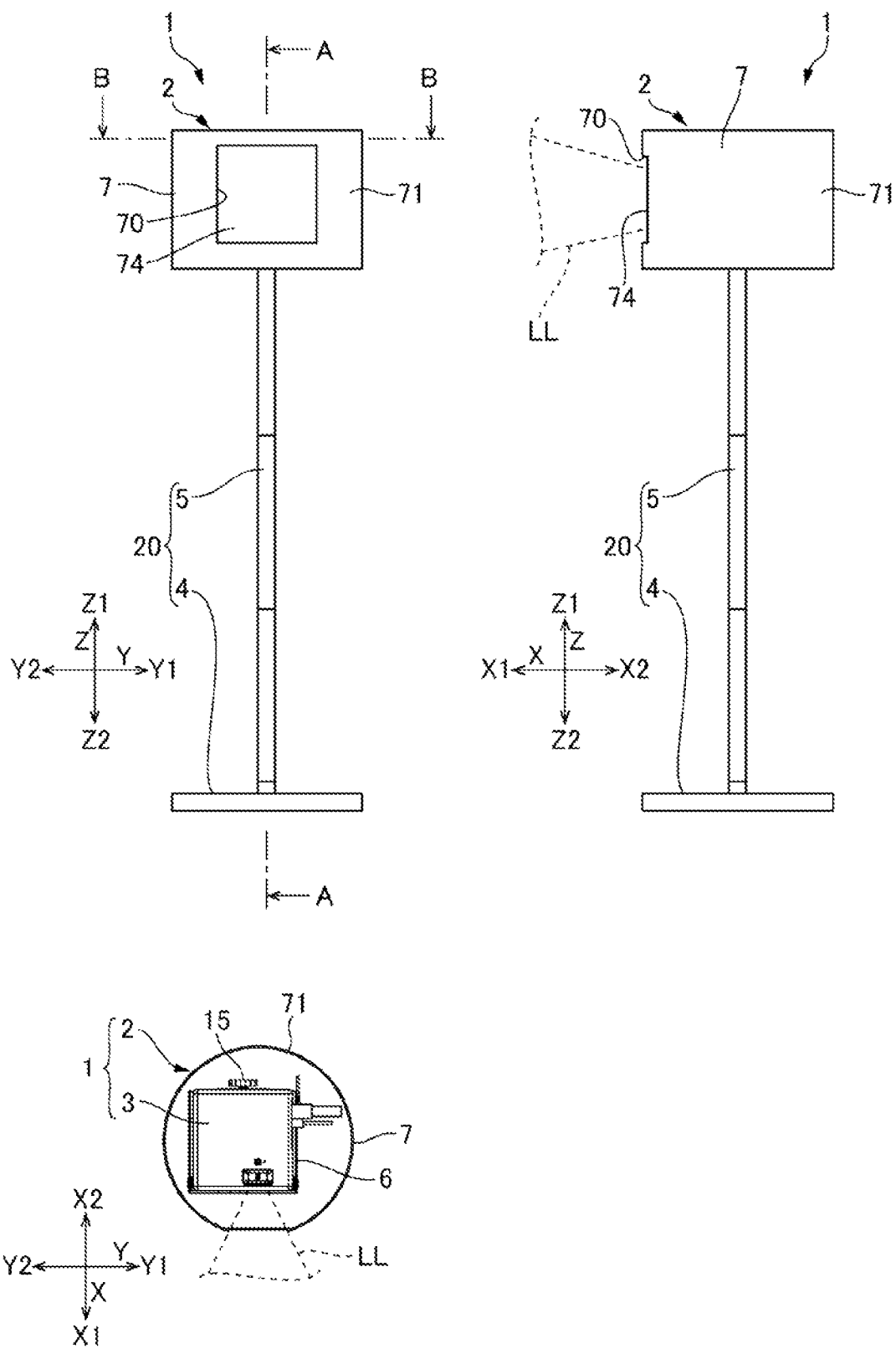
FIG. 2 includes a front view and a side view of the illumination device with projector shown in FIG. 1, and a cross-sectional view thereof cut along an X-Y plane.
Figure 3:
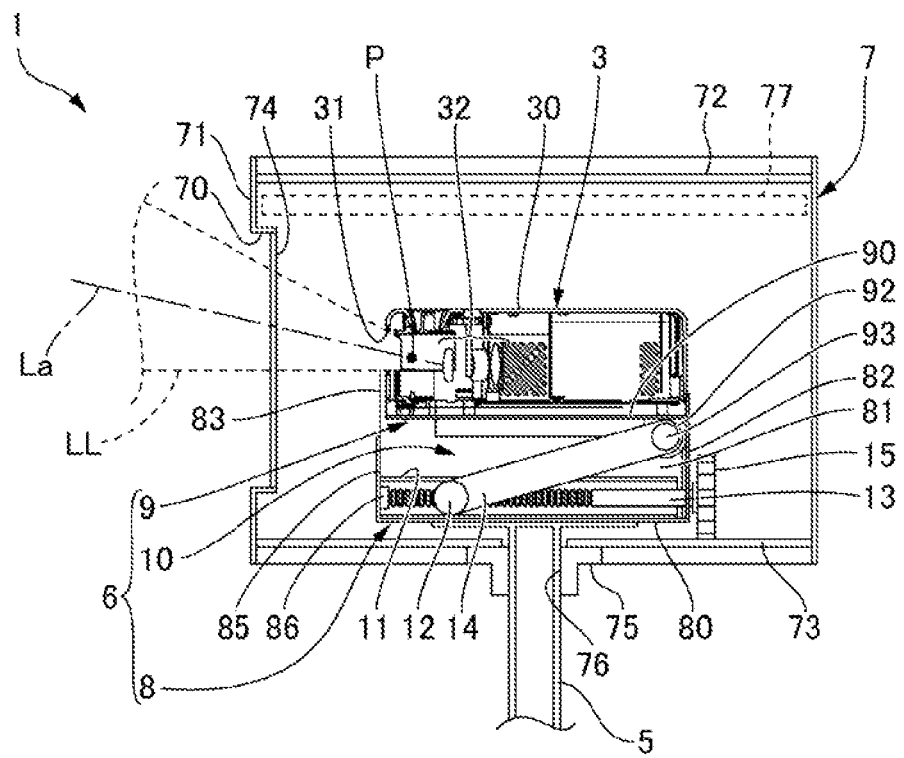
FIG. 3 is a cross-sectional view of the illumination device with projector shown in FIG. 1 cut along a Y-Z plane, and is a diagram showing a situation in which a projection direction of projection light changes between an obliquely upward direction and an obliquely downward direction.
Figure 3:
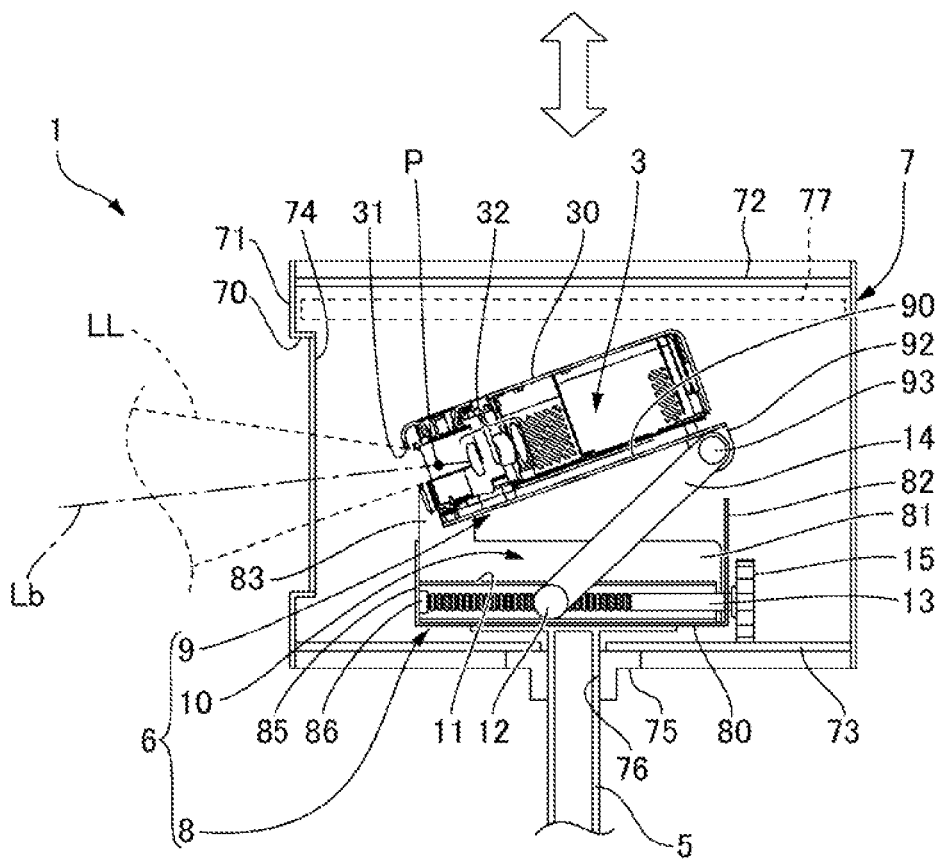

FIG. 1 is an external perspective view of an illumination device 1 with projector to which the present disclosure is applied. FIG. 2 includes a front view and a side view of the illumination device with projector 1 shown in FIG. 1, and a cross-sectional view thereof cut along an X-Y plane (at a position B-B in the front view shown in FIG. 2). FIG. 3 is a cross-sectional view of the illumination device with projector 1 shown in FIG. 1 cut along a Y-Z plane (at a position A-A in the front view shown in FIG. 2), and is a diagram showing a situation in which a projection direction of projection light LL changes between an obliquely upward direction and an obliquely downward direction. In the present specification, an X direction, a Y direction, and a Z direction are directions perpendicular to each other. The Z direction is a vertical direction wherein a Z1 direction is an upward direction, and a Z2 direction is a downward direction. The Y direction is a width direction of the illumination device with projector 1, wherein a Y1 direction is one side in the width direction, and a Y2 direction is the other side in the width direction. The X direction is a front-back direction of the illumination device with projector 1, wherein an X1 direction is a frontward direction, and an X2 direction is a backward direction. The X1 direction, (the frontward direction) is a direction in which the projection light LL of the illumination device with projector 1 is projected.

The illumination device with projector 1 is provided with an illumination device 2 of a stand illumination type, and a projector 3 installed inside the illumination device 2. The illumination device 2 is provided with a pedestal part 4, a support post 5 extending from the pedestal part 4 toward the Z1 direction, a projector holding section 6 to be coupled to a tip portion of the support post 5, and a shade 7 surrounding the projector holding section 6. The projector holding section 6 is provided with a base Z coupled to the tip portion of the support post 5, a mounting stage 9 to rotatably be coupled to the base 8, and an angle adjustment mechanism 10 disposed between the base 8 and the mounting stage 5. The projector 3 is mounted on the mounting stage 9. The projection light. LL to be projected from the projector 3 is projected toward the outside of the shade 7 from a projection opening 70 disposed on a side surface of the shade 7.

Stand Part

The pedestal part 4 and the support post 5 constitute a stand part 20 of the illumination device with projector 1. The stand part 20 is installed on a target installation surface such as the floor. The projector holding section 6 and the shade 7 are coupled to the stand part 20, and are supported by the stand part 20.

Projector

As shown in FIG. 3, the projector 3 is provided with an exterior case 30, and an opening part 31 provided to an end surface at an exit side of the exterior case 30. The projector 3 emits the projection light LL from the opening part 31. The exterior case 30 is formed of, for example, flame-resistant resin or metal. Further, the projector 3 is provided with a light source section and an image generation section not shown, a projection optical system 32, a fan and a control section not shown, wherein the light source section, the image generation section, the projection optical system 32, the fan, and the control section are housed in the exterior case 30. The projection optical system 33 projects an image generated by the image generation section in an enlarged manner.

Shade

The shade 7 is provided with a side surface part 71 having a cylindrical shape, an upper surface part 72 closing an end part at the Z1 side of the side surface part 71, and a lower surface part 73 closing an end part at the Z2 side of the side surface part 73. The side surface part 71 is a light blocking member made of a material which blocks light such as metal. It should be noted that it is possible to dispose cloth on a surface of the light blocking member to form the side surface part 71. The side surface part 71 is provided with the projection opening 70 having a rectangular shape opposed to the opening part 31 of the projector 3. The opening height in the Z direction of the opening part 31 is the height with which the projection light LL passes through a range of the projection opening 70 even when a light axis of the projection light LL is tilted maximally toward the Z1 direction and even when the light axis of the projection light LL is tilted maximally toward the Z2 direction.

The projection opening 70 is provided with a transmission plate 74. In the present embodiment, the transmission plate 74 is a semi-transmissive mirror shaped like a flat plate, Therefore, the projection light LL projected from the projector 3 passes through the transmission plate 74, and is then projected to the outside of the shade 7, and outside light is reflected by the transmission plate 74. It should be noted that the transmission plate 74 can be a polarization plate.

The upper surface part 72 and the lower surface part 73 each have a circular shape. As shown in FIG. 3, the shade 7 is fixed to the support post 5 via a fixation part 75 arranged at the center of the lower surface part 73. The fixation part 75 can be formed integrally with the lower surface part 73, or can also be a separate member from the lower surface part 73. The tip portion of the support post 5 extends toward the 21 side from a hole 76 of the fixation part 75, and is coupled to the base 8 inside the shade 7.

The upper surface part 72 and the lower surface part 73 are each a diffuser plate for diffusely transmitting light. The illumination device with projector 1 is provided with an illumination part 77 disposed inside the shade 7. In the present embodiment, the illumination part. 77 is disposed at the Z2 side of the upper surface part 72. When the upper surface part 72 is irradiated with illumination light of the illumination part 77, the light is diffusely emitted toward the 21 side from, the upper surface part 72. The illumination part 77 is a sheet light source having light emitting elements such as an LED arranged on a substrate. The illumination part 77 is fixed to the side surface part 71, and is supported by the support, post 5 via the shade 7. The illumination part 77 can be disposed at the Z1 side of the lower surface part 73. In this case, the light is diffusely emitted toward the Z2 side from the lower surface part 73. Further, it is possible to adopt a configuration in which the illumination part 77 is disposed at two places, namely a place at the Z2 side of the upper surface part 72 and a place at the Z1 side of the lower surface part 72 to thereby emit the illumination light from the upper surface part. 72 and the lower surface part 72.

A vent hole not shown is provided to one or both of the upper surface part 72 and the lower surface part 73, and a fan not shown is disposed inside the vent hole. Therefore, since air flows along the illumination part 77 by driving the fan, the illumination part 77 is cooled. Further, exhaust air from the projector 3 is discharged to the outside of the shade 7 from, the vent hole, and thus, it is possible to cool the projector 3.

A speaker not shown is disposed inside the shade 7. Wiring lines coupled to the projector 3 and the speaker are inserted inside the support post 5, and are coupled to a power supply device disposed inside the pedestal part 4. The speaker is coupled to the projector 3 using near field communication or wired communication, and generates a sound based on an electrical signal supplied from the projector 3. The speaker can be disposed in a space for disposing the speaker disposed at the Z2 side of the base 8, or can be disposed at the Z1 side of the projector 3.

Base

Figure 4:
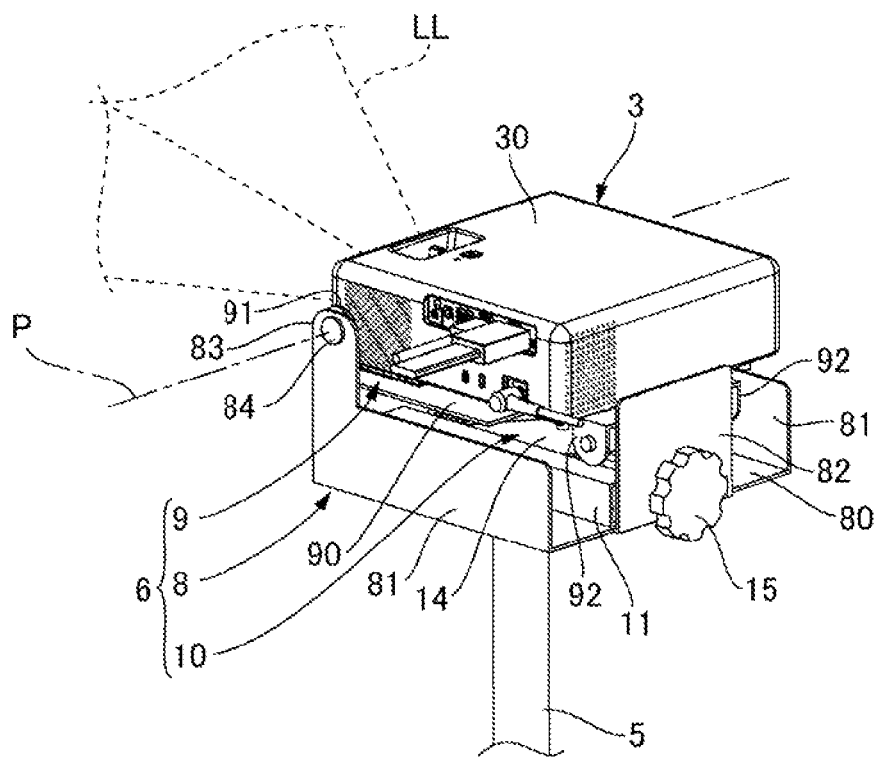
FIG. 4 is a perspective view of the projector and a projector holding section, and is a diagram showing a situation in which the projection direction of the projection light changes between the obliquely upward direction and the obliquely downward direction.
Figure 4:
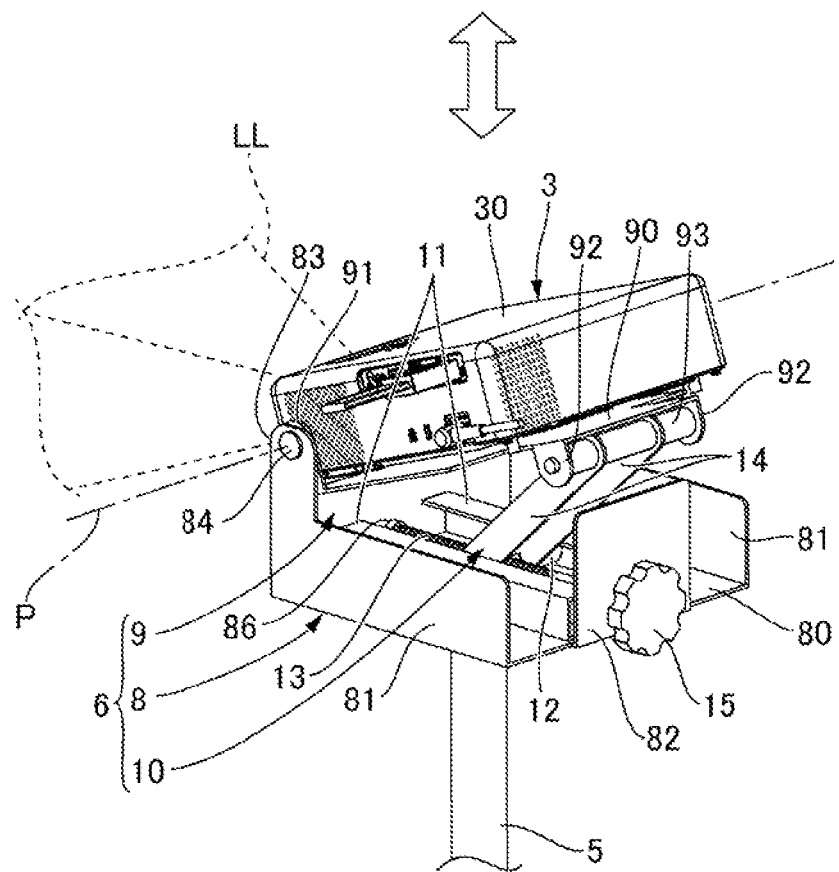

FIG. 4 is a perspective view of the projector 3 and the projector holding section 6, and is a diagram showing a situation in which the projection direction of the projection light LL changes between the obliquely upward direction and the obliquely downward direction. The base 8 is provided with a bottom plate 80 to be coupled to an upper end of the support post 5, a pair of side plates 81, 81 rising toward the Z1 side from an end edge at the Y1 side and an end edge at the Y2 side of the bottom plate 80, and a back plate 82 rising toward the Z1 side from a central portion of an end edge at the X2 side of the bottom plate 80. The base 8 is provided with protruding parts 63 each protruding toward the Z1 side from an end portion at the X1 side of the side plate 81, and rotary support parts 84 each disposed at a tip of the protruding part 83. Therefore, the base 8 is provided with the pair of rotary support parts 84 opposed to each other in the Y direction. Further, as shown in FIG. 3, the base 6 is provided with a front plate 85 rising toward the Z1 side from an end edge at the X1 side of the bottom plate 80.

Mounting Stage

The mounting stage 9 is provided with the mounting plate 90 on which the projector 3 is mounted, a pair of anterior coupling plates 91, 91 protruding toward the Z1 side from end edges at the Y1 side and the Y2 side in an end portion at the X1 side of the mounting plate 90, a pair of posterior coupling plates 92, 92 protruding toward the Z2 side from end edges at the Y1 side and the Y2 side in an end portion at the X2 side of the mounting plate 90, and a support shaft 93 supported at both ends by the posterior coupling plates 92, 92. The pair of anterior coupling plates 91, 91 are disposed between the pair of protruding parts 93, 83 provided to the base 8. The anterior coupling plates 91 are coupled to the rotary support parts 84 provided to the protruding parts 83, respectively. Thus, the mounting stage 9 is rotatably coupled to the base 8 centering on a rotational axis line P passing the centers of the rotary support parts 34 and extending in the Y direction.

The rotational axis line P of the mounting stage 9 crosses the light axis of the projection light LL of the projector 3. Therefore, the projector 3 mounted on the mounting stage 9 is supported in a state in which a tilt angle of the projection light LL can be adjusted. Further, the rotational axis line V of the mounting stage 9 crosses an end portion at the exit side of the projector 3. Therefore, since the projector 3 is rotatably supported centering on the end portion at the exit side, the tilt angle of the projection light LL emitted from the projector 3 changes centering on the end portion at the exit side of the projector 3. It should be noted that the end portion at the exit side of the projector 3 is not limited to the end surface at the exit side of the exterior case 30, but includes an inside area from the end surface at the exit side of the exterior case 30.

Angle Adjustment Mechanism

The angle adjustment mechanism 10 is a mechanism for changing the tilt angle of the mounting stage 9 with respect to the base 6. The angle adjustment mechanism 10 changes the direction of the light axis of the projection light LL emitted from the projector 3 between a first direction La and a second direction Lb shown in FIG. 3. The first direction La is the obliquely upward direction, and the second direction Lb is the obliquely downward direction. In the present embodiment, the tilt angle of the first direction La with respect to the horizontal plane is larger than the tilt angle of the second direction Lb with respect to the horizontal plane. Therefore, it is advantageous when projecting the projection image on a surface located above the shade 7. It should be noted that the angle adjustment range of the angle adjustment mechanism 10 can be different from a range shown in FIG. 3. For example, it is possible to define the direction tilted as much as 30° upward from the horizontal plane as the first direction La, and to define the direction tilted as much as 30° downward from the horizontal plane as the second direction Lb.

As shown in FIG. 3 and FIG. 4, the angle adjustment mechanism 10 is provided with a pair of guide members 11, 11 to be fixed to the base 8, a slider 12 supported at both ends by the pair of guide members 11, 11, a threaded shaft 13 to be screwed into a threaded hole provided to the slider 12, and two arms 14, 14 for coupling the slider 12 and the mounting stage 9 to each other. One end of each of the arms 14 is rotatably coupled to an end portion of the slider 12, and the other end thereof is rotatably coupled to the mounting stage 9. The coupling position between the arm 14 and the mounting stage 9 is a position located at a distance from the rotational axis line P. In the present embodiment, the other end of the arm 14 is coupled to the support shaft 93 disposed in an end portion at the X2 side of the mounting stage 3.

The pair of guide members 11, II extend in parallel to the X direction, and are fixed to the bottom plate 80. The threaded shaft 13 is disposed between the pair of guide members 11, 11, and extends in the X direction. The threaded shaft 13 is rotatably supported by a rotary support part 36 provided to the front plate 85, and a through hole (not shown) provided to the back plate 82. To an end portion at the X2 side of the threaded shaft 13, there is fixed a rotary knob 15 for manually rotating the threaded shaft 13.

When adjusting the tilt angle of the projection light LL, the rotary knob 15 is gripped, and then the threaded shaft 13 is manually rotated to thereby move the slider 12 in the X direction. Thus, the one ends of the arms 14 coupled to the slider 12 move in the X direction, and therefore, the other ends of the arms 14 and the end portion at the X2 side of the mounting stage 9 move in the vertical direction, and the mounting stage 9 rotates centering on the rotational axis line P, As a result, the tilt angle of the projector 3 changes, and thus, the tilt angle of the projection light LL changes.

When rotating the threaded shaft 13 in a direction of moving the one ends of the arms 14 coupled to the slider 12 toward the XX side, the end portions at the X2 side of the arms 14 fall toward the Z2 side, and thus, the mounting stage 9 takes a flat posture as shown in an upper drawing in FIG. 3 and an upper drawing in FIG. 4. On this occasion, the direction of the light axis of the projection light LL emitted from the projector 3 becomes the first direction La pointing obliquely upward. In contrast, when rotating the threaded shaft 13 in a reverse direction to move the one ends of the arms 14 toward the X2 side, the end portions at the X2 side of the arms 14 and the mounting stage 9 rise, and thus, the end portion at the X2 side of the mounting stage 9 rises toward the Z1 side centering on the rotational axis line P as shown in a lower drawing in FIG. 3 and a lower drawing in FIG. 4. Thus, the direction of the light, axis of the projection light LL emitted from the projector 3 becomes the second direction Lb pointing obliquely downward.

Major Functions and Advantages of Present Embodiment

As described hereinabove, the illumination device with projector 1 according to the present embodiment has the projector 3 having the projection optical system 32, the projector holding section 6 for holding the projector 3, the stand part 20 to be coupled to the projector holding section 6, and the shade 7 which covers the periphery of the projector holding section 6, and is provided with the projection opening 70 through which the projection light LL emitted from the projector 3 passes. The projector holding section 6 is provided with the angle adjustment mechanism 10 for changing the tilt angle of the projector 3 centering on the end portion at the exit side of the projector 3.

Further, the illumination device with projector 1 is constituted by the illumination device 2 and the projector 3. The illumination device 2 has the projector holding section 6, the stand part 20 to be coupled to the projector holding section 6, and the shade 7 for covering the periphery of the projector holding section 6. The shade 7 is provided with the projection opening 70 through which the projection light LL emitted from the projector 3 held by the projector holding section 6 passes, and the projector holding section 6 is provided with the angle adjustment mechanism 10 for changing the tilt angle of the projector 3 centering on the end portion at the exit side of the projector 3.

In the present embodiment, it is possible to project the projection light LL of the projector 3 surrounded by the shade 7 to the outside through the projection opening 70 provided to the shade 7. Therefore it is possible to project the projection image while preventing the existence of the projector 3 from being felt. Further, since there is provided the stand part 20, when being not used as the projector 3, usage as a standing-type illumination device is possible. Therefore, the installation and the translation are easy, and the convenience is high. Further, it is easy to fit in the space.

In the present embodiment, the tilt angle of the projector 3 is changed centering on the end portion at the exit side of the projector 3. Therefore, since the projection direction can be made variable, it is possible to change the projection position of the projection image, and the convenience is high. Further, since the projection direction of the projection light LL is changed by changing the tilt angle of the projector 3 itself, there is no need to install an optical member such as a mirror inside the shade 7. Therefore, since it is possible to reduce the size of the mechanism for making the projection direction variable, it is possible to prevent the shade 7 from growing in site. Therefore, the limitation of the installation location is loose. Further, since the projector 3 is tilted centering on the end portion at the exit side, the distance between the rotational axis line P of the projector 3 and the projection opening 70 is short. Therefore, it is possible to prevent the projection opening 70 from growing in size due to the change in the projection direction of the projection light LL, and it is possible to make the projection opening 70 inconspicuous. Therefore, it is possible to prevent the appearance as the illumination device from being damaged, and it is possible to prevent the existence of the projector 3 from being felt.

In the present embodiment, the projector holding section 6 is provided with the base 8 to be coupled to the stand part 20, and the mounting stage 9 on which the projector 3 is mounted, and which is supported so as to be able to rotate centering on the rotational axis line P crossing the end portion at the exit side of the projector 3 with respect to the base 8, and the angle adjustment mechanism 10 changes the tilt angle of the mounting stage 9 with respect to the base 6. By adopting such a configuration, it is easy to install the projector 3. Further, coupling to the stand part 20 is easy.

In the present embodiment, the angle adjustment mechanism 10 is provided with the arms 14 the one ends of which are coupled to the base 8 via the slider 12, and the other ends of which are coupled to the mounting stage 9 at a position at a distance from the rotational axis line P, and the threaded shaft 13 screwed with the slider 12. By rotating the threaded shaft 13, the angle adjustment mechanism 10 moves the other ends of the arms 14 via the slider 12 to rotate the mounting stage 9 around the rotational axis line P. Such an angle adjustment mechanism 10 can be disposed between the base 8 and the mounting stage 9, and is small in installation space. Further, the operation of rotating the threaded shaft 13 is easy, and a fine angle adjustment is also easy. Further, in the present embodiment, since the rotary knob 15 for a manual operation is attached to the threaded shaft 13, it is possible to easily perform the manual angle adjustment.

In the present embodiment, the shade 7 is provided with the side surface part 71 formed of the light blocking member. The projection opening 70 is provided to the side surface part 71, and the transmission plate 74 provided to the projection opening 70 is formed of a semi-transmissive mirror or a polarization plate. Therefore, it is possible to project the projection light LL from the projector 3 disposed inside the side surface part 71 to the outside of the shade 7 via the semi-transmissive mirror, but the existence of the projector 3 cannot be seen from the outside of the shade 7, and the projection opening 70 cannot be seen from the outside since the projection opening 70 is covered with the semi-transmissive mirror. Therefore, since it is possible to prevent the existence of the projector 3 from being felt when viewing the illumination device 2, the illumination device 2 is easy to fit in the space.

In the present embodiment, there is provided the illumination part 77 disposed inside the shade 7, and the illumination light of the illumination part 77 is emitted from at least one of the upper surface part 72 and the lower surface part 73 of the shade 7. Therefore, since the usage as the illumination device is possible, it is easy to fit in the installation space. Further, since the illumination light is emitted in a direction different from the exit direction of the projection light LL, it is possible to prevent the illumination light from interfering with the projection light LL. Therefore, it is possible to use the illumination part 77 ever, when using the projector 3. Further, it is easy to dispose the illumination part 77 at the position where the illumination part 77 does not interfere with the projector 3.

MODIFIED EXAMPLES (1) In the embodiment described above, the position of the rotational axis line P of the projector 3 is an intermediate position between the opening part 31 of the exterior case 30 and an end portion at the exit side of the projection optical system 32 disposed at the inner side of the opening part 31 as shown in FIG. 3. As described above, when the opening part 31 is disposed in the end portion at the exit extreme side of the projector 3, and the projection optical system 32 is disposed at the inner side of the opening part 31, it is possible to adopt a configuration in which the position of the rotational axis line P coincides with the position of the opening part 31. In this way, it is possible to shorten the distance between the rotational center of the projector 3 and the projection opening 70. Therefore, even when making the projection direction of the projection light LL variable, it is possible to prevent the projection opening 70 from growing in size, and therefore, it is possible to prevent the appearance as the illumination device from being damaged.

(2) Alternatively, when the configuration of the projector 3 is a configuration in which a lens barrel part for holding the projection optical system 32 protrudes from the opening part 31 of the exterior case 30, it is possible to adopt a configuration in which the position of the rotational axis line P coincides with the end portion at the exit side of the projection optical system 32. In this way, it is possible to shorten the distance between the rotational center of the projector 3 and the projection opening 70. Therefore, even when making the projection direction of the projection light LL variable, it is possible to prevent the projection opening 70 from growing in size, and therefore, it is possible to prevent the appearance as the illumination device from being damaged. It should be noted that the expression that the position of the rotational axis line P coincides with the end portion at the exit side of the projection optical system 32 includes the fact that the position of the rotational axis line P is located in an inner area from an end surface at the exit side of the projection optical system 32. When the position of the rotational axis line P coincides with the end surface at the exit side of the projection optical system 32, the advantage thereof is significant.

Figure 5:
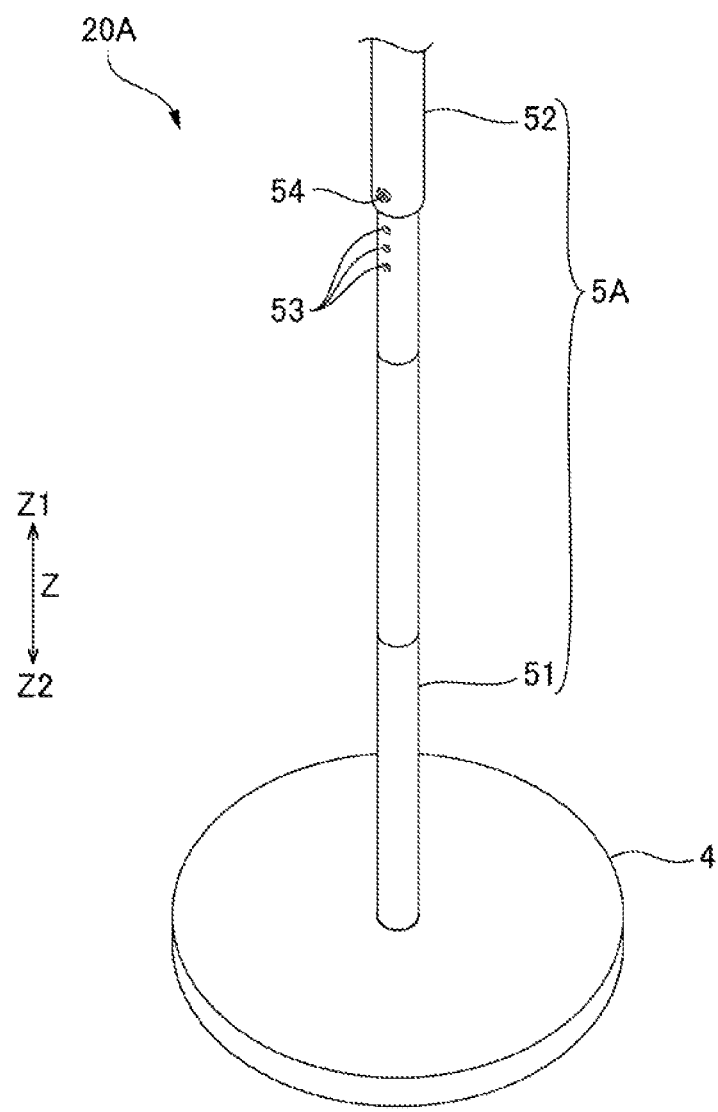
FIG. 5 is a perspective view of a stand part provided with a height adjustment mechanism.

(3) Although in the embodiment described above, the height (the length) in the Z direction of the stand part 20 is not variable, it is possible to adopt a stand part 20A provided with a height adjustment mechanism instead of the stand part 20 in the embodiment described above. FIG. 5 is a perspective view of the stand part 20A provided with the height adjustment mechanism. The stand part 20A is provided with the pedestal part 4 and a support post 5A. The support post 5A is provided with a first member 31 extending toward the Z1 direction from the pedestal part 4, and a second member 52 coupled to a tip portion of the first member 51. To a tip of the second member 52, there is coupled the projector holding section 6. The second member 52 is a cylindrical member larger in diameter than the first member 51. By inserting the tip portion of the first member 51 into an end portion at the 22 side of the second member 52, the second member 52 is coupled to the first member 51 so as to be able to slide in the 2 direction.

The height adjustment mechanism is provided with a plurality of first fixation holes 53 provided to the first member 51, the second member 52 which is provided with a single second fixation hole 54, and is slidably coupled to the first member 51, and a fixation member (not shown) which is inserted into the second fixation hole 54, and a tip portion of which is screwed to one of the first fixation holes 53. Since the plurality of first fixation holes 53 is arranged in the 2 direction, by changing the position of the first fixation hole 53 to which the fixation member is screwed, it is possible to change the position in the Z direction of the second member 52. Thus, it is possible to make the height in the 2 direction of the stand part 20A variable. By making the height adjustment of the stand part 20A possible, it becomes easy to change the installation location. For example, installation on a table, in bedside, and so on becomes possible in addition to the installation on the floor.

Figure 6:
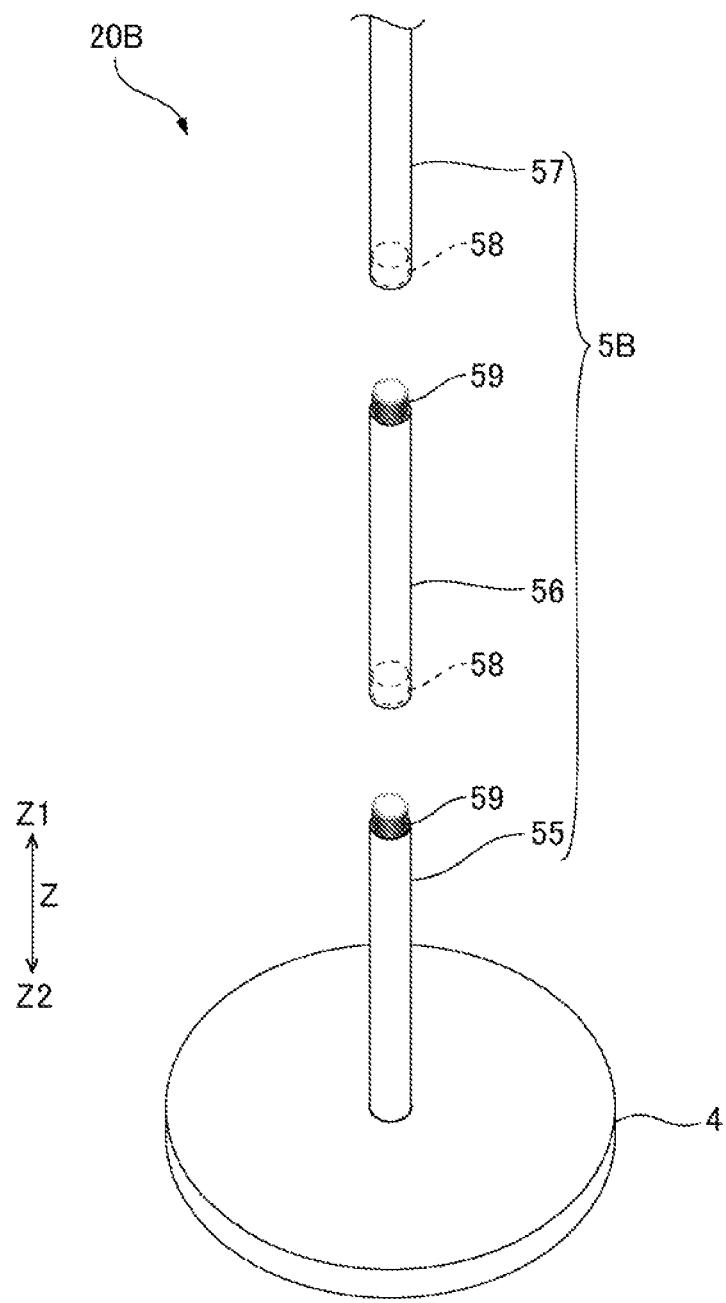
FIG. 6 is a perspective view of a stand part provided with a height adjustment mechanism of a modified example.

(4) FIG. 6 is a perspective view of a stand part 20B provided with a height adjustment mechanism of a modified example. The stand part 20B is provided with the pedestal part 4 and a support post 5B. In the support post 5B, a part in the height direction is replaceable. The support, post 5B is provided with a first; member 55 extending toward the 21 direction from the pedestal part 4, a second member 56 detachably coupled to a tip portion of the first member 55, and a third member 57 detachably coupled to a tip portion of the second member 56. To a tip of the third member 57, there is coupled the projector holding section 6.

An end portion at the 21 side of the first member 55 and an end portion at the 21 side of the second member 56 are each provided with an external thread part 5S, and an end portion at the 22 side of the second member 56 and an end portion at the 22 side of the third member 57 are each provided with an internal thread part 59. Therefore, in the support post 5B of the stand part 20B, the second member 56 can be attached to and detached from the first member 55 and the third member 57. As described above, since the stand part 20B is provided with the second member 56 which can be attached to and detached from the first member 55 to be coupled to the pedestal part 4 and the third member 57 to be coupled to the projector holding section 6 as the height adjustment mechanism, it is possible to replace the second member 56 with another member different in length. Therefore, it is possible to make the height in the 2 direction of the stand part 20B variable.

Figure 7:
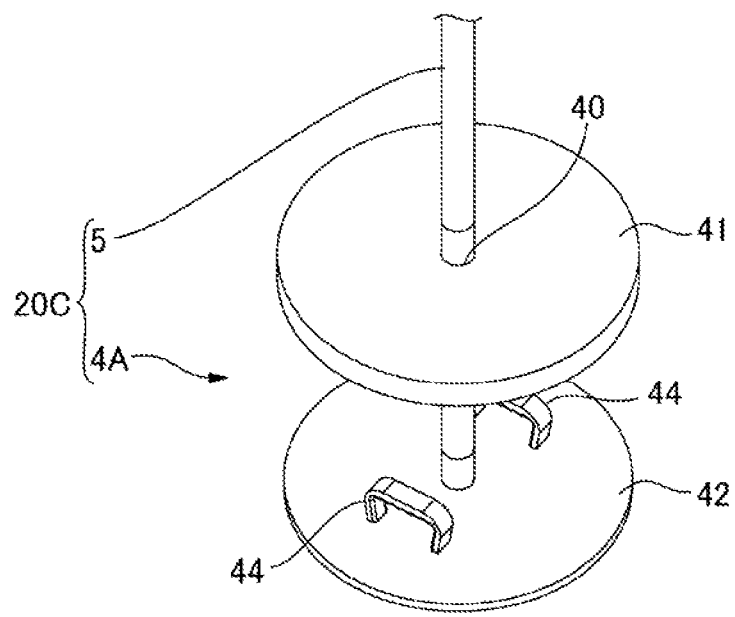
FIG. 7 is an exploded perspective view of the stand part, provided with a fixation mechanism viewed from above.
Figure 8:
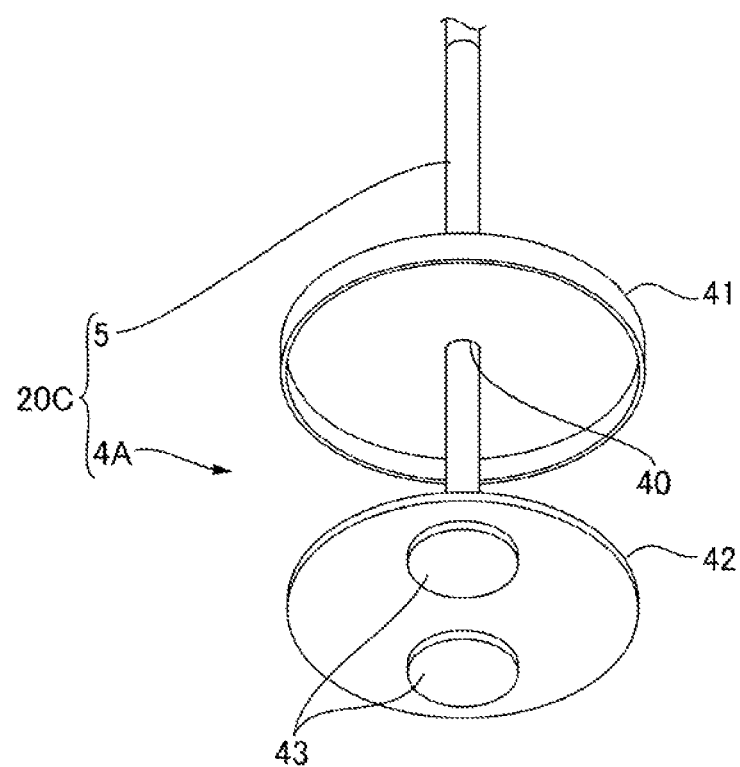
FIG. 8 is an exploded perspective view of the stand part provided with the fixation mechanism viewed from below.

(5) Although in the embodiment described above, the at end part 20 is not provided with a mechanism for fixing the stand part 20 to the target installation surface such as the floor, it is possible to adopt a stand part 20C provided with a fixation mechanism for fixing the stand part 20C to the target installation surface instead of the stand part 20 in the embodiment described above. FIG. 7 is an exploded perspective view of the stand part 20C provided with the fixation mechanism viewed from above. FIG. 3 is an exploded perspective view of the stand part 20C provided with the fixation mechanism viewed from below. The stand part 20C is provided with a pedestal part 4A and the support post 5. The support pest 5 is coupled to the projector holding section 6.

The pedestal part 4A is provided with a cover 41 provided with a hole 40 for allowing the support post 5 to pass through, an installation part 42 to be coupled to the support post 5, and the fixation mechanism for fixing the installation part 42 to the target installation surface. The fixation mechanism is a suction-lock mechanism, and is provided with suction parts 43 disposed on a surface at the 22 side of the installation part 42, and levers 44 which are coupled to the suction parts 43, and are disposed at the 22 side of the installation part 42. As shown in FIG. 7 and FIG. 3, the cover 41 is lifted toward the Z1 side to expose the fixation mechanism, and then an operation of fixing the installation part 42 to the target installation surface, and an operation of releasing the fixation are performed. By moving the cover 41 to the lower end of the support, post 5 to cover the installation part 42 after the operations, it is possible to conceal the fixation mechanism.

When fixing the installation part 42 to the target installation surface, first, the stand part 20C is positioned on the target installation surface. Then, the cover 41 is lifted toward the Z1 side, and then a predetermined operation such as an operation of raising the levers 44 which have fallen down, or an operation of rotating the levers 44 is performed on the levers 44. Thus, the suction parts 43 adhere to the target installation surface, and thus, the stand part 20C is fixed to the target installation surface. When operating the levers 44 in a reverse direction from the direction in the suction operation, the suction state of the suction parts 43 to the target installation surface is released. Therefore, it is possible to displace the stand part 200.

By providing the fixation mechanism to the pedestal part 4A, it is possible to prevent the position of the illumination device with projector 1 from being displaced after the installation, and therefore, it is possible to reduce the trouble of readjusting the position of the illumination device with projector 1. Further, since the cover 41 for covering the fixation mechanism is provided, it is possible to improve the appearance, and at the same time, it is possible to prevent an unintended fixation releasing operation from being performed.

Figure 9:
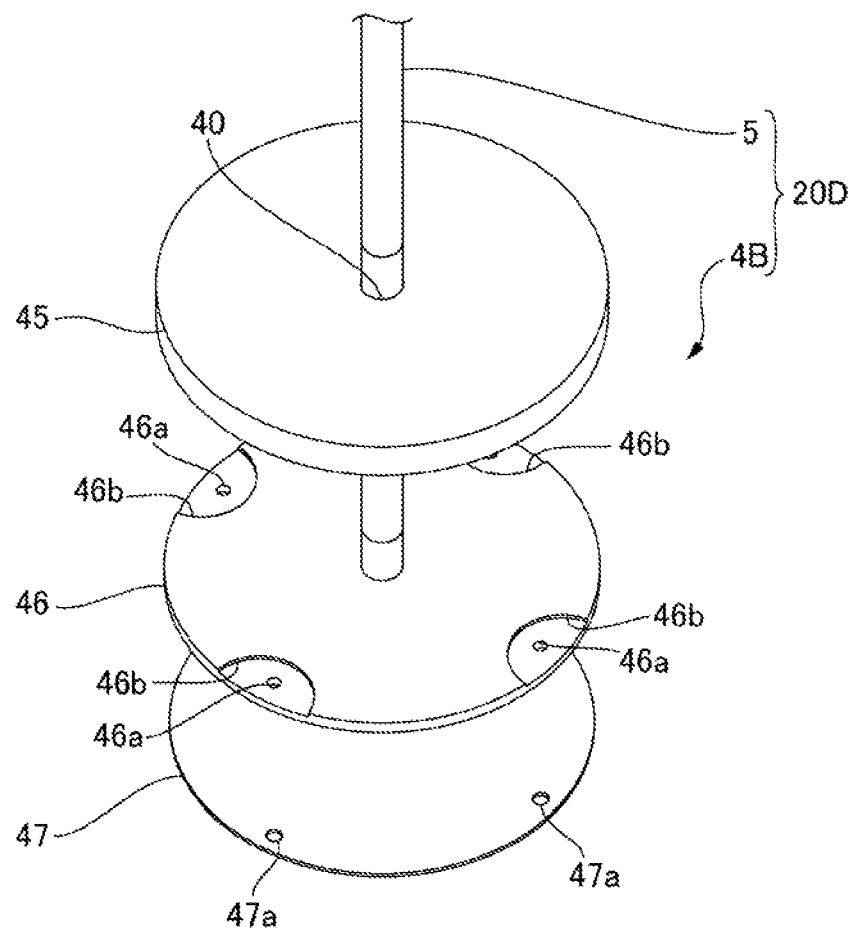
FIG. 9 is an exploded perspective view of the stand part provided with a fixation mechanism of a modified example viewed from above.

(6) FIG. 9 is a perspective view of a stand part 20D provided with a fixation mechanism of a modified example. The stand part 20D is provided with a pedestal part 4B and the support post 5. The support pest 5 is coupled to the projector holding section 6. The pedestal part 45 is provided with a cover 45 provided with the hole 40 for allowing the support post 5 to pass through, an installation part 46 to be coupled to the support post 5, and the fixation mechanism for fixing the installation part 46 to the target installation surface. The fixation mechanism is provided with an antislip member 47 disposed between the installation part 46 and the target installation surface, and fixation holes 46a provided to the installation part 46. The antislip member 47 is a sheet member high in friction coefficient such as rubber. The fixation holes 46a open on bottom surfaces of recessed parts 46b provided to the installation part 46. Further, the antislip member 47 is provided with fixation holes 47a disposed at positions overlapping the fixation holes 46a, respectively.

When fixing the installation part 46 to the target installation surface, first, the cover 45 is lifted toward the Z1 side. Then, the antislip member 47 is inserted between the target installation surface and the installation part 46, and the installation part 46 is positioned. Then fixation members such as screws not shown are inserted into the fixation holes 46a and the fixation holes 47a to screw the fixation members to the target installation surface. After the screwing, the cover 45 is moved to the lower end of the support post 5 to cover the installation part 46. As described above, by providing the fixation mechanism to the pedestal part 4B, it is possible to prevent the position of the illumination device with projector 1 from being displaced after the installation, and therefore, it is possible to reduce the trouble of readjusting the position of the illumination device with projector 1.

(7) When the target installation surface is not a smooth surface, but is a resilient flooring covering or a carpet, it is possible to use a sheet fastener attached to the bottom surface of the pedestal part 4 as a fixation mechanism.

(8) Although in the embodiment, described above, the angle adjustment mechanism 10 has the configuration in which the angle adjustment is performed by manually rotating the threaded shaft 13, it is possible to adopt a configuration in which the angle adjustment is performed using an actuator such as a motor. In this case, it is preferable to lay around wiring of the actuator to the power supply device together with wiring of the projector 3 and wiring of the illumination part 77. Further, when providing an operation section for performing the operation of the angle adjustment mechanism 10 to a controller for performing the operation of the projector 3 and the operation of the illumination part 77, there is no need to provide a dedicated controller.

What is claimed is:

1. An illumination device with projector comprising:
   a projector having a projection optical system;
   a projector holding section configured to hold the projector;
   a stand part to be coupled to the projector holding section; and
   a shade which is configured to cover a periphery of the projector holding section, and is provided with a projection opening through which projection light emitted from the projector is transmitted, wherein
   the projector holding section is provided with an angle adjustment mechanism configured to change a tilt angle of the projector, the tilt angle tilting around an end portion at an exit side of the projector, the end portion where the tilt angle tilts around being located between the projection optical system and the projection opening in a direction in which the projection light transmits through the projection opening.

2. The illumination device with projector according to claim 1, wherein
   the angle adjustment mechanism changes the tilt angle of the projector centering on an end portion at an exit side of the projection optical system.

3. The illumination device with projector according to claim 1, wherein
   the projector is provided with an exterior case provided with an opening part opposed to the projection opening, and
   the angle adjustment mechanism changes the tilt angle of the projector centering on the opening part.

4. The illumination device with projector according to claim 1, wherein
   the projector holding section includes
      a base to be coupled to the stand part, and
      a mounting stage on which the projector is mounted, and which is rotatably supported centering on a rotational axis line crossing the end portion at the exit side of the projector with respect to the base, and
   the angle adjustment mechanism changes a tilt angle of the mounting stage with respect to the base.

5. The illumination device with projector according to claim 4, wherein
   the angle adjustment mechanism
      includes an arm one end of which is coupled to the base via a slider, and another end of which is coupled to the mounting stage at a position at a distance from the rotational axis line, and a threaded shaft screwed with the slider, and
      moves the another end of the arm via the slider in response to rotation of the threaded shaft to thereby rotate the mounting stage around the rotational axis line.

6. The illumination device with projector according to claim 1, wherein
   the shade is provided with a side surface part made of a light blocking member, and
   the projection opening is provided to the side surface part, and is provided with a semi-transmissive mirror or a polarization plate.

7. The illumination device with projector according to claim 1, further comprising:
   an illumination part disposed inside the shade, wherein
   illumination light of the illumination part is emitted from at least one of an upper surface part and a lower surface part of the shade.

8. The illumination device with projector according to claim 1, wherein
   the stand part is provided with a support post to be coupled to the projector holding section, and
   the support post is provided with a height adjustment mechanism.

9. The illumination device with projector according to claim 1, wherein
   the stand part is provided with a support post to be coupled to the projector holding section, and
   a part in a height direction of the support post is replaceable.

10. The illumination device with projector according to claim 1, wherein
    the stand part is provided with a support post one end of which is coupled to the projector holding section, and
    a pedestal part to be coupled to another end of the support post, and
    the pedestal part is provided with a fixation mechanism configured to fix the pedestal part to a target installation surface.

11. An illumination device comprising:
    a projector holding section;
    a stand part to be coupled to the projector holding section; and
    a shade configured to cover a periphery of the projector holding section, wherein the shade is provided with a projection opening through which projection light emitted from a projector to be held by the projector holding section is transmitted, and the projector holding section is provided with an angle adjustment mechanism configured to change a tilt angle of the projector, on the tilt angle tilting around an end portion at an exit side of the projector, the end portion where the tilt angle tilts around being located between the projection optical system and the projection opening in a direction in which the projection light transmits through the projection opening.

\* \* \* \* \*